Sept. 18, 1934.                J. W. CLARKE ET AL                1,974,261
                              METHOD FOR USING LATEX
                        Filed Dec. 15, 1932        2 Sheets-Sheet 2
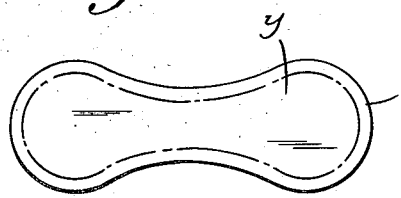 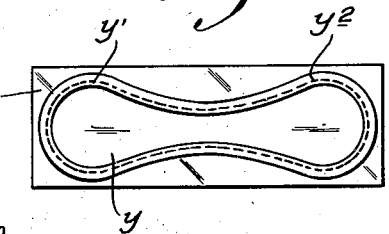
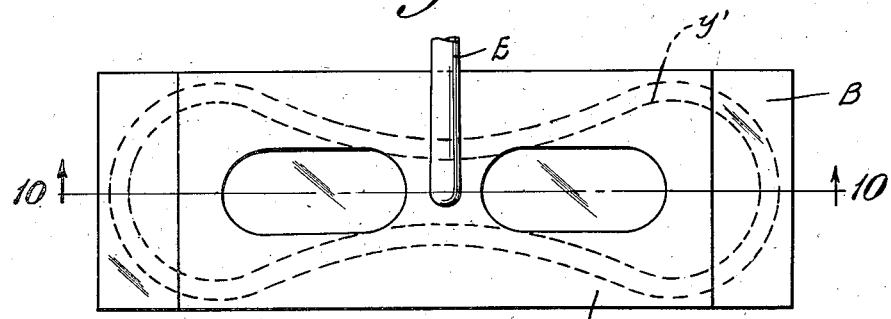
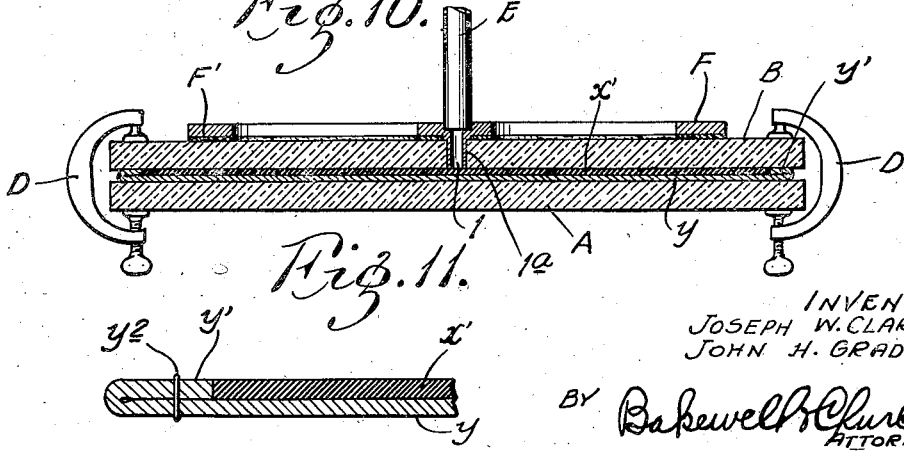
INVENTORS
JOSEPH W. CLARKE
JOHN H. GRADY.
BY Bakewell & Church
ATTORNEYS Patented Sept. 18, 1934

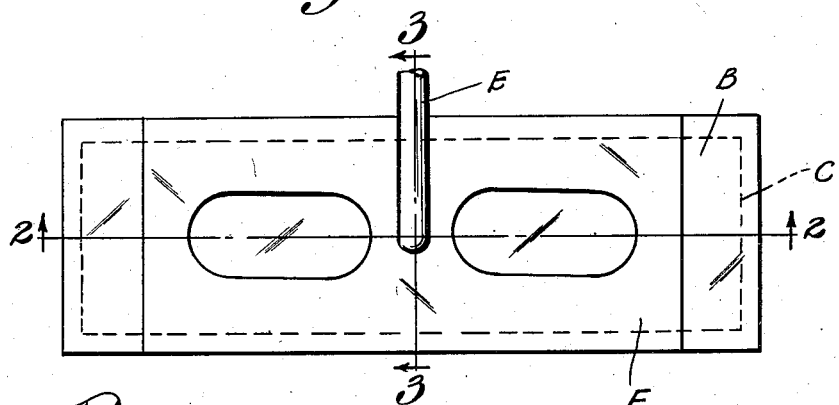
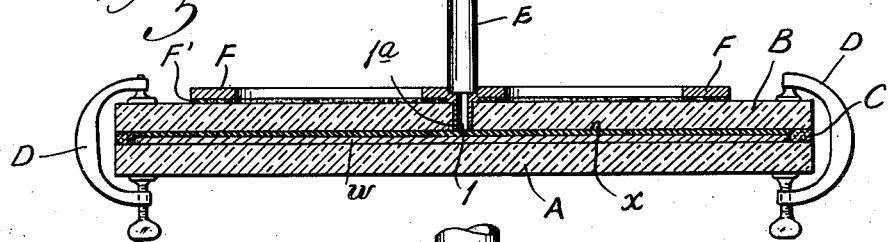
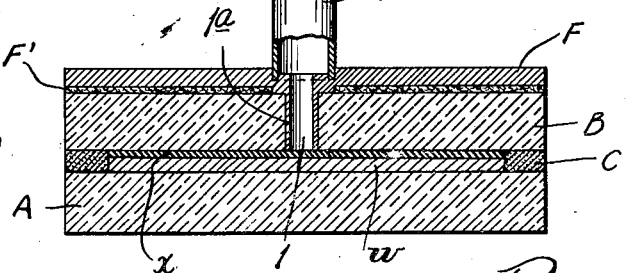
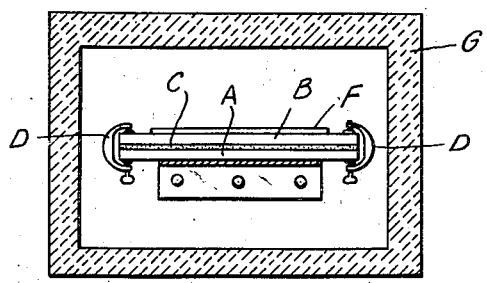
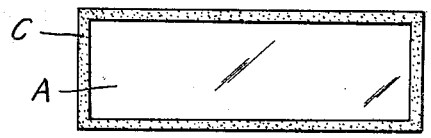

1,974,261

UNITED STATES PATENT OFFICE 1,974,261

METHOD FOR USING LATEX

Joseph W. Clarke and John H. Grady, St. Louis, Mo., assignors to J. H. Grady Manufacturing Company, St. Louis, Mo., a corporation of Missouri Application December 15, 1932, Serial No. 647,346

3 Claims. (Cl. 18—59)

This invention relates to a novel method of using the substance or material commonly called "Latex", which consists of crude rubber mixed with a medium or agent in such proportions as to produce a rubber solution or compound that will remain in a liquid or substantially liquid state and not deteriorate, if protected from the atmosphere.

Prior to our invention the conventional method of using latex consisted of brushing, spreading or flowing the latex onto a piece of fabric so as to form a rubber coating for same, and then permitting the latex to "set", congeal or solidify by the action of the air on same. Such a method of using latex is open to the objections that the rubber coating formed by the latex is not of uniform thickness, it is seldom perfectly smooth and of attractive appearance, and the procedure is slow and expensive, due to the time required for the latex to set or congeal.

We have devised a rapid and inexpensive method by which the rubber solution or liquid rubber compound commonly called "Latex" can be combined with fabric, leather or other suitable material to form a rubber coating or protective sheathing for same, that is of uniform thickness, perfectly smooth and of attractive appearance.

Figure 1 of the drawings is a top plan view of one form of apparatus that may be used in practising our method.

Figure 2 is a vertical longitudinal sectional view, taken on the line 2—2 of Figure 1, looking in the direction indicated by the arrows.

Figure 3 is a transverse sectional view, taken on the line 3—3 of Figure 1.

Figure 4 is a vertical transverse sectional view, illustrating the mold shown in Figure 2 positioned in a heater or drier.

Figure 5 is a top plan view of the bottom part of the mold shown in Figure 2.

Figure 6 is a top plan view of the bottom part of a mold of slightly different construction, intended to be used for applying a rubber sheathing or coating to an article whose peripheral edge is turned over or folded so as to produce a marginal rim on said article that confines the latex and forms in effect the side wall of the mold space in which the latex is shaped.

Figure 7 is a top plan view of said article before the peripheral edge of same is turned over or folded.

Figure 8 is a top plan view, showing said article positioned on the bottom part of the mold.

Figure 9 is an enlarged top plan view of the complete mold, with the article to be coated positioned between the top and bottom parts of the mold.

Figure 10 is a vertical longitudinal sectional view, taken on the line 10—10 of Figure 9; and Figure 11 is an enlarged fragmentary sectional view of the completed article after it has been removed from the mold.

The apparatus illustrated in Figures 1 to 5, inclusive, is intended to be used to apply a coating or sheathing of latex to a sheet of material or to an article whose peripheral edge is unfinished or not folded over. Said apparatus comprises a bottom member A, a top member B, a side wall member C and clamps or any other suitable means D for clamping or binding said members tightly together. If the sheet or article to be covered is flat and smooth, the opposed faces of said bottom member A and top member B will be perfectly flat and smooth, and the side wall member C will be of such shape that when it is clamped between the members A and B, it will co-act with same to form a closed chamber or space into which latex can be introduced, preferably under pressure, through a supply pipe E that communicates with an inlet 1 formed in the top member B of the mold. The mold members can be constructed from various materials, but we prefer to form the bottom member A and top member B from glass and the side wall member from cork or some other suitable material that is sufficiently resilient or compressible to produce air-tight joints between the same and the members A and B when the clamps C are tightened. One advantage of constructing the mold members, particularly the top member B from glass, is that such material produces an impervious mold member having a polished surface that imparts an attractive finish to the latex after it has "set" or congealed. Glass has the added advantage that it is transparent, and hence, the operator can readily see whether the latex completely fills the mold. The inlet 1 to the mold cavity or chamber is herein illustrated as being formed by a metal nipple 1ª positioned in a hole in the top member B of the mold and attached to a metal plate F that is permanently attached to the mold member B and insulated from same by a non-metallic pad F, said metal plate being preferably provided with holes or cut-outs so as to enable the operator to observe the action of the latex in the mold cavity. The supply pipe E is preferably combined with the plate F in such a way that it can be easily connected with or detached from same, thereby enabling the same supply pipe to be used for introducing the latex into a plurality of molds.

To produce a rubber sheathed or coated article by our method, an article or object $w$, such, for example, as one formed from a piece of leather or fabric, is first placed on the bottom member B with the side wall member C completely surrounding said article. The top member B of the mold is then positioned on the side wall member C and clamped by the means D used to bind the mold members together. Latex is then admitted to the space or cavity of the mold, preferably under a pressure varying from one half a pound to three pounds. The supply pipe E is then disconnected from the mold, after which the mold is put aside until the latex in the cavity of the mold has set or hardened. Preferably, the mold is introduced into a heater or drier G, wherein the mold is subjected to the action of heated air, as in this way the latex will congeal or set within thirty to forty minutes, it being, of course, understood that the mold members are retained in their clamped position so that the latex will be closely confined or held in intimate contact with the walls of the mold cavity while the latex is solidifying. Thereafter, the mold is removed from the drier or heater, and the parts of the mold are disassembled so as to discharge the finished product consisting of a perfectly flat and smooth sheet of rubber of uniform thickness.

In the above operation the water given off by the latex as it coagulates, is absorbed by the article or sheet of material to which the latex is applied. When the article is removed from the mold it will be found to have a perfectly smooth rubber coating of uniform thickness and attractive appearance that adheres tightly to the leather, fabric or other material of which the article is constructed.

Figures 6 to 11 of the drawings illustrate how our method and apparatus are used to form a rubber coating or sheathing on an object or article formed from a piece $y$ of leather, fabric or other material whose marginal edge portion $y'$ is turned over or folded and secured by stitches $y^2$, as shown in Figure 8. The apparatus is the same as the apparatus previously described, except that it does not comprise a side wall member C, as such a side wall member is unnecessary, due to the fact that the folded or turned over peripheral edge $y'$ of the article $y$ forms an upwardly projecting rim on the top side or face of the article that co-acts with the top member B of the mold to form a gas and liquid-tight cavity or space into which the latex is introduced. After the article $y$ has been clamped tightly between the top and bottom mold members, the latex is introduced into the space between said members, thereby forming a rubber coating $x'$ of uniform thickness on the top surface of the article $y$, as shown in Figure 10. The mold with the rubber sheathed article clamped therein is preferably subjected to the action of heated, circulating air in a drier or heater G, as previously explained, and, when the article is removed from the mold, it will be found to have a perfectly smooth rubber coating that is of uniform thickness and of the same thickness as the folded peripheral edge portion $y'$ of the article. Obviously, the rim-like portion $y'$ of the article that acts as the side wall portion of the mold cavity, might be formed by a separate strip or piece of material attached to the article $y$, instead of by an integral folded portion of said article.

The method above described is not only rapid, inexpensive, and easy to control, but it enables latex to be used for many purposes not possible with the prior method of using latex, and moreover, produces rubber coated articles that are superior both in construction and in appearance to those heretofore produced from latex.

Having thus described our invention, what we claim as new and desire to secure by Letters Patent is:

1. A method of using latex, which consists in arranging a sheet or article formed of fabric, leather or the like in a mold cavity in opposed relation to a polished surface of said mold, thereafter introducing latex into the mold cavity so as to completely fill the space between said article and said polished surface, and confining the latex while it is setting or congealing.

2. A method of the kind described in claim 1, characterized by subjecting the mold to heat while the latex is confined therein.

3. A method of the kind described in claim 1, characterized by circulating heated air over the mold while the latex is confined therein.

JOSEPH W. CLARKE.
JOHN H. GRADY.